(12) United States Patent
Iwanami et al.

(10) Patent No.: US 6,637,230 B2
(45) Date of Patent: Oct. 28, 2003

(54) AUTOMOTIVE AIR-CONDITIONER HAVING SUB-COMPRESSOR DRIVEN BY ELECTRIC MOTOR

(75) Inventors: Shigeki Iwanami, Okazaki (JP); Yasushi Suzuki, Chiryu (JP); Junzo Kawasumi, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/107,172

(22) Filed: Mar. 28, 2002

(65) Prior Publication Data

US 2002/0157412 A1 Oct. 31, 2002

(30) Foreign Application Priority Data

Apr. 27, 2001 (JP) .................................... 2001-131604
May 22, 2001 (JP) .................................... 2001-152771
Sep. 12, 2001 (JP) .................................... 2001-277184

(51) Int. Cl.$^7$ ................................................. B60H 1/32
(52) U.S. Cl. ...................................... 62/244; 62/196.3
(58) Field of Search ....................... 62/244, 498, 196.2, 62/196.3

(56) References Cited

U.S. PATENT DOCUMENTS

| 3,528,260 | A | * | 9/1970 | Binder .......................... 62/498 |
| 4,614,089 | A | * | 9/1986 | Dorsey .......................... 62/158 |
| 4,757,694 | A | * | 7/1988 | Espinosa ....................... 62/175 |
| 4,947,657 | A | * | 8/1990 | Kalmbach ..................... 62/236 |
| 5,428,966 | A | * | 7/1995 | Alsenz .......................... 62/116 |
| 5,435,144 | A | * | 7/1995 | Kalmbach ....................... 62/84 |
| 5,692,387 | A | * | 12/1997 | Alsenz et al. ................. 62/184 |
| 5,802,861 | A | * | 9/1998 | Yamashita et al. ............ 62/133 |

FOREIGN PATENT DOCUMENTS

| JP | 402220922 A | * | 9/1990 | ................... 165/42 |
| JP | 403208722 A | * | 9/1991 | ..................... 62/61 |
| JP | 404340062 A | * | 11/1992 | ............ F25B/11/02 |
| JP | U-2000-127753 | | 5/2000 | |

* cited by examiner

Primary Examiner—William E. Tapolcai
Assistant Examiner—Mohammad M. Ali
(74) Attorney, Agent, or Firm—Posz & Bethards, PLC

(57) ABSTRACT

An air-conditioner for use in an automotive vehicle, an engine of which is stopped every time the vehicle stops at an intersection, includes a usual refrigeration cycle having a main compressor driven by the engine and a sub-circuit having a sub-compressor driven by an electric motor. The sub-compressor is connected in parallel to the main compressor, and both compressors are alternately driven. Refrigerant mixed with lubricant circulating in the main refrigeration cycle is prevented from entering into the sub-circuit while the sub-compressor is not in operation by means of a piping structure of the sub-circuit. When the refrigerant enters into the sub-circuit, it is efficiently returned to the main refrigeration cycle by intermittently operating the sub-compressor while the main compressor is operating.

22 Claims, 12 Drawing Sheets

AUTOMOTIVE AIR-CONDITIONER HAVING SUB-COMPRESSOR DRIVEN BY ELECTRIC MOTOR

CROSS-REFERENCE TO RELATED APPLICATION

This application is based upon and claims benefit of priority of Japanese Patent Applications No. 2001-131604 filed on Apr. 27, 2001, No. 2001-152771 filed on May 22, 2001 and No. 2001-277184 filed on Sep. 12, 2001, the contents of which are incorporated herein by reference.

BACKGROUND OF THE INVENTION

1. Field of the Invention

The present invention relates to an air-conditioner for use in an automotive vehicle in which an internal combustion engine mounted thereon is automatically stopped when the automotive vehicle comes to a temporary halt at an intersection or the like.

2. Description of Related Art

Recently, an automotive vehicle having a so-called idle-stop device, which automatically stops an engine when the vehicle comes to a temporary halt at an intersection or the like for saving fuel consumption, is being introduced in the market. Since a compressor of an air-conditioner mounted on such a vehicle is driven by the engine, operation of the compressor is also stopped when the engine is temporarily stopped. If the compressor comes to a halt, the air-conditioner does not perform a desired function.

JP-A-2000-127753 proposes an air-conditioner system which solves the above problem. In this system, a sub-compressor which is driven by an electric motor during a period in which the main compressor is not driven by the engine is connected in parallel to the main compressor. In this manner, the air-conditioner is able to continue its operation during such a period. Since sub-compressor is connected in parallel to the main refrigeration circuit in this system, refrigerant mixed with lubricant circulating in the main refrigeration circuit tends to enter into a sub-circuit including the sub-compressor when the main compressor is operated and the sub-compressor is not operated. The refrigerant entered into the sub-circuit still remains therein when the operation of the main compressor resumes. Therefore, an amount of refrigerant including lubricant becomes short in the main refrigeration circuit, and the main compressor cannot be properly lubricated. This results in not only insufficient cooling ability of the air-conditioner but also reduction in an operable life of the main compressor.

Since the main compressor and the sub-compressor are alternately operated, the same problem also occurs in the sub-circuit including the sub-compressor. The refrigerant mixed with lubricant enters into the sub-circuit or the main refrigeration circuit and remains therein is called "sleeping refrigerant". In order to reduce the amount of the sleeping refrigerant, the above-mentioned JP-A-2000-127753 also proposes to dispose one-way check valves in both the main circuit and the sub-circuit, or to install valves switching flow directions of the refrigerant at junctions connecting the sub-circuit to the main refrigeration circuit. If one-way check valves are used, four of them are necessary to control the flow directions of the refrigerant. This makes the air-conditioner expensive and complex, and further makes it difficult to add the sub-circuit including the sub-compressor to the existing main refrigeration circuit.

SUMMARY OF THE INVENTION

The present invention has been made in view of the above-mentioned problems, and an object of the present invention is to provide an improved automotive air-conditioner having a sub-compressor driven by an electric motor, and more particularly to reduce an amount of refrigerant remaining both in a main refrigeration circuit and in a sub-circuit of such an air-conditioner without making its structure complex. Another object of the present invention is to improve durability of the compressor by providing the compressors with sufficient lubrication. Another object of the present invention is to provide an air-conditioner in which the sub-circuit including the sub-compressor is easily added to an existing refrigeration circuit. Yet another object of the present invention is to provide an air-conditioner having a sub-compressor which is driven quietly during a vehicle is not driven.

The air-conditioner of the present invention is mounted on an automotive vehicle which has a so-called idle-stop mechanism. An internal combustion engine for driving the vehicle is stopped every time the vehicle temporarily stops at an intersection or the like for saving fuel consumption.

The air-conditioner includes a main refrigeration circuit and a sub-circuit. The main refrigeration circuit is composed of a main compressor, condenser, an expansion valve and an evaporator, all connected in series. The main compressor and the evaporator is connected through a low pressure tube, and the main compressor and the condenser is connected through a high pressure tube. A first junction and a second junction are formed in the low pressure tube and in the high pressure tube, respectively. The sub-circuit is composed of a sub-compressor and inlet and outlet pipes connected to the sub-compressor. The sub-compressor is connected in parallel to the main compressor by connecting the sub-circuit between the first and the second junctions.

The main compressor is driven by the engine while the engine is in operation, and the sub-compressor is driven by an electric motor while the engine is not in operation. Thus, the air-conditioning ability of the air-conditioner is maintained at a required level even when the engine is not in operation. The capacity of the sub-compressor is smaller than that of the main compressor, and the pipe size in the sub-circuit is made smaller than that of the main refrigeration circuit.

Because the sub-compressor is not in operation while the main compressor is in operation, refrigerant mixed with lubricant circulating in the main refrigeration circuit enters into the sub-circuit and retained therein. This causes shortage of refrigerant in the main refrigeration circuit. On the other hand, the refrigerant may be retained in the main refrigerant circuit while the main compressor is not in operation, causing refrigerant shortage in the sub-circuit.

To prevent the refrigerant from entering into the sub-circuit and being retained therein, the inlet pipe and the outlet pipe of the sub-circuit are branched out upwardly from the first and the second junctions. This structure suppresses refrigerant communication between the main refrigerant circuit and the sub-circuit. The inlet pipe of the sub-compressor may be branched out from the first junction first downwardly and then upwardly. In this manner, the refrigerant held in the downwardly branched out portion is sucked into the sub-circuit when the sub-compressor resumes its operation thereby to sufficiently lubricate the sub-compressor.

The sub-compressor and the electric motor for driving the sub-compressor may be contained in an unitary package.

The unitary package is mounted on the vehicle via a shock absorbing member to alleviate vibration transferred from the vehicle to the sub-compressor. Looped or cranked portions may be formed in the inlet and the outlet pipes of the sub-compressor, respectively, to alleviate vibration transferred from the sub-compressor to the main refrigeration circuit. The sub-circuit composed of the sub-compressor and the inlet and outlet pipes is easily added to the main refrigeration circuit, e.g., to an existing refrigeration circuit.

Alternatively, the electric motor for driving the sub-compressor may be controlled by an electronic controller to return the refrigerant remaining in the sub-circuit to the main refrigeration circuit, or vice versa. The sub-compressor may be driven for a short predetermined period when the main compressor is in operation. In this manner, the refrigerant retained in the sub-circuit while the sub-compressor is not in operation is returned to the main refrigeration circuit. The sub-compressor may be intermittently and repeatedly operated for that short predetermined period with a certain interval in order to sufficiently return the refrigerant to the main refrigeration circuit. The sub-compressor may be driven for a short predetermined period immediately after the main compressor resumes its operation to lubricate the main compressor. The predetermined short period may be changed according to operating conditions of the engine or a required heat load of the air-conditioner. In case the refrigerant is retained in the main refrigerant circuit, the sub-compressor may be driven for a short time immediately before the sub-compressor resumes its operation. In this manner, the refrigerant retained in the main refrigerant circuit is returned to the sub-circuit to lubricate the sub-compressor.

Alternatively, a compressor having a variable capacity may be used as the main compressor. The capacity is increased to a level higher than a level for attaining a required cooling ability for a predetermined period of time immediately after the main compressor resumes its operation. In this manner, the refrigerant retained in the sub-circuit is instantly sucked into the main refrigerant circuit. The capacity may be increased up to a maximum capacity of the variable-capacity compressor. The capacity increase may be intermittently repeated during a period in which the variable-capacity compressor is in operation.

According to the present invention, the refrigerant mixed with lubricant is prevented from entering into the circuit which is not in operation by a simple and inexpensive structure in the air-conditioner. Both the main compressor and the sub-compressor are sufficiently lubricated, and thereby durability of the compressors is improved. The sub-circuit including the sub-compressor is easily mounted on the vehicle while suppressing noises generated by the sub-compressor. Further, the refrigerant retained in the sub-circuit or the main refrigeration circuit is efficiently returned to right positions requiring the refrigerant.

Other objects and features of the present invention will become more readily apparent from a better understanding of the preferred embodiments described below with reference to the following drawings.

DETAILED DESCRIPTION OF THE PREFERRED EMBODIMENTS

Figure 1:
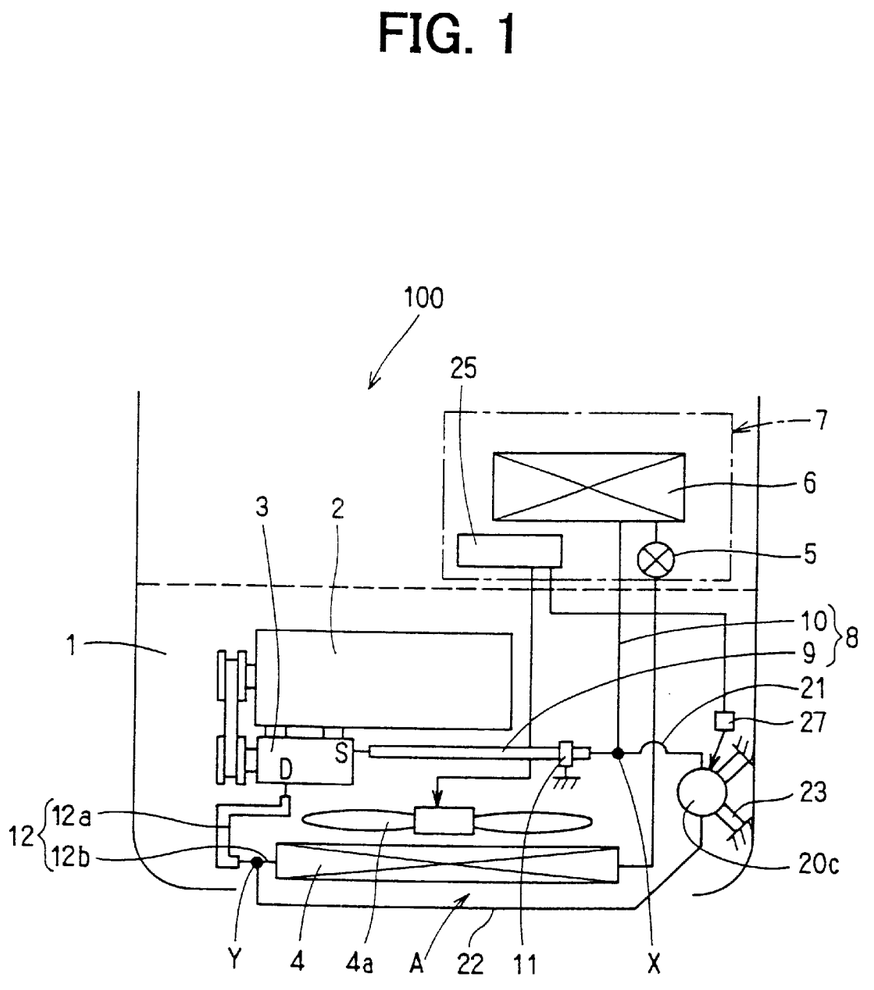
FIG. 1 is a schematic block diagram showing an automotive air-conditioner having a sub-compressor.
Figure 2:
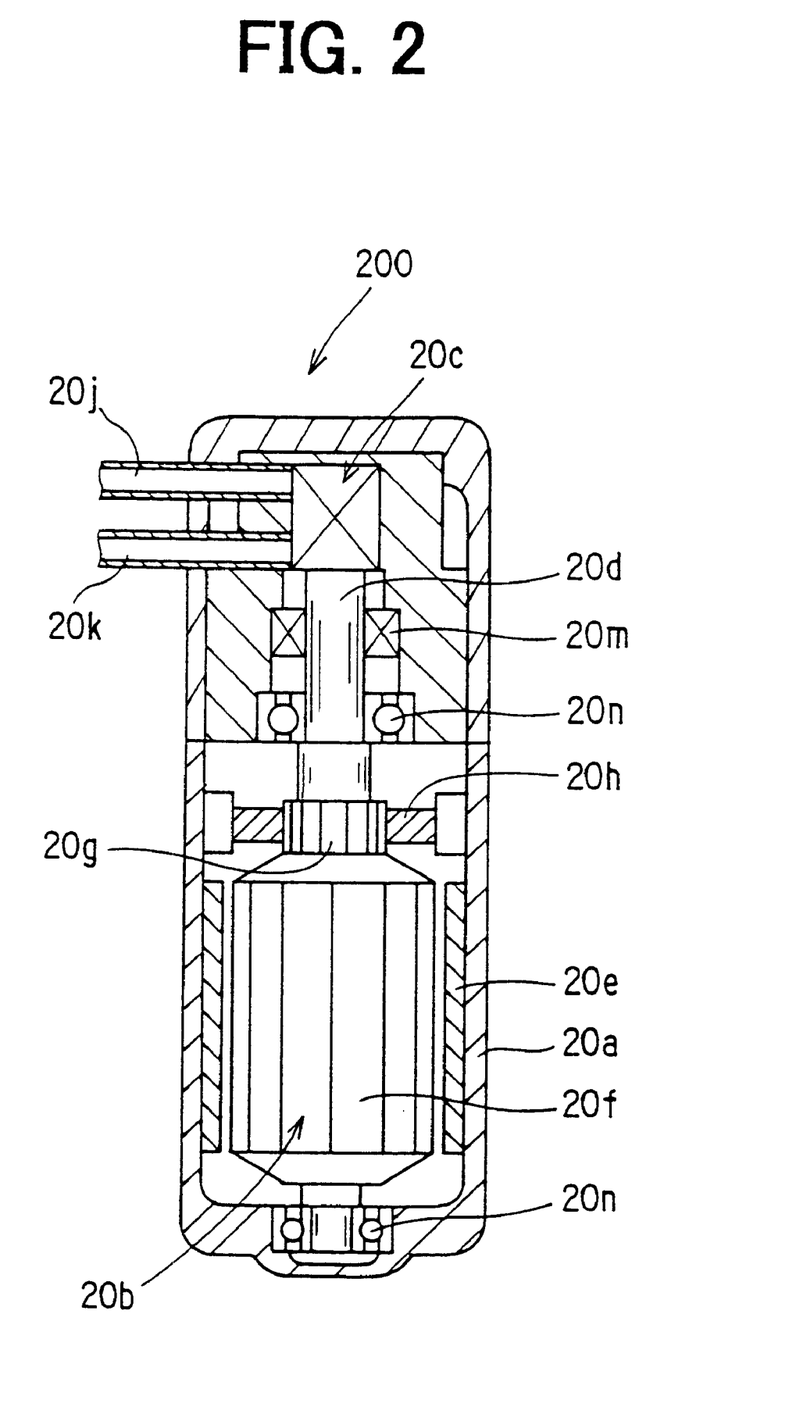
FIG. 2 is a cross-sectional view showing a sub-compressor unit used in the air-conditioner shown in FIG. 1.
Figure 3:
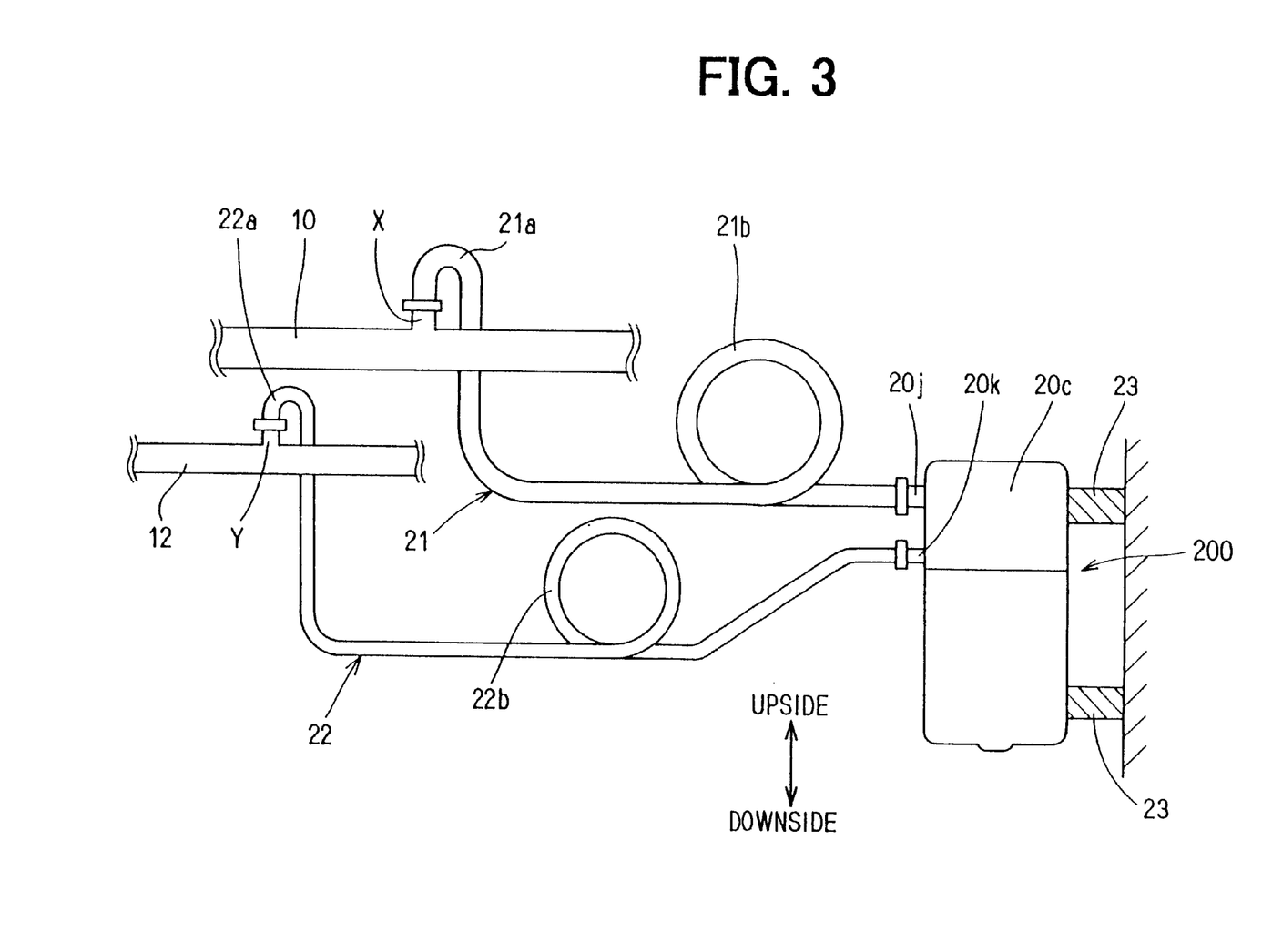
FIG. 3 is a schematic view showing a structure of junctions at which a sub-circuit including the sub-compressor is connected to a main refrigeration circuit, as a first embodiment of the present invention.

A first embodiment of the present invention will be described with reference to FIGS. 1–3. First, referring to FIG. 1 an entire structure of an air-conditioner having a refrigeration circuit and a sub-circuit including a sub-compressor connected in parallel to the refrigeration circuit will be described. A refrigeration circuit "A" used in the air-conditioner is a known one that includes a main compressor 3, a condenser 4, an expansion valve S and an evaporator 6, all connected in series in this order. The main compressor 3 is driven by an internal combustion engine 2 via a belt in an ON-and-OFF fashion. Refrigerant mixed with lubricant (referred to as refrigerant) is compressed by the main compressor 3, and the compressed refrigerant is cooled down in the condenser 4 and condensed therein. The condenser 4 is cooled by a cooling fan 4a driven by a motor. The condensed refrigerant is depressurized by the expansion valve 5 and is sent to the evaporator 6. The condensed refrigerant is expanded in the evaporator 6 thereby to cool down air in a passenger compartment. An air-conditioner compartment unit 7 including the evaporator 6 and the expansion valve 5 is installed in a passenger compartment.

The main compressor 3 and the evaporator 6 are connected through a low pressure tube 8 consisting of a flexible hose 9 disposed at the compressor side and a metallic tube 10 positioned at the evaporator side. The flexible hose 9 is made of a resilient material such as rubber, and the metallic tube 10 is made of a metallic material such as aluminum. One end of the flexible hose 9 is fixed to a vehicle body by a fixing member 11. The main compressor 3 and the condenser 4 are connected through a high pressure tube 12 consisting of a flexible tube 12a made of a flexible material such as rubber and a metallic tube 12b. The flexible tube 12a is connected to the main compressor 3 while the metallic tube 12b is connected to the condenser 4. A first junction "X" is formed in the metallic tube 10 at a position close to a point connecting the metallic tube 10 to the flexible hose 9. A second junction "Y" is formed in the metallic tube 12b at a position close to a point connecting the metallic tube 12b to the flexible tube 12a.

A sub-compressor 20c driven by an electric motor is connected in parallel to the main compressor 3. More particularly, an intake pipe 21 of the sub-compressor 20c is connected to the first junction X, and an outlet pipe 22 of the sub-compressor 20c is connected to the second junction Y. The sub-compressor 20c, the intake pipe 21, and the outlet pipe 22 constitute a sub-circuit which is connected between the first junction X and the second junction Y as a whole.

A sub-compressor unit 200 that includes the sub-compressor 20c will be described with reference to FIG. 2. The sub-compressor unit 200 is composed of the sub-compressor 20c and an electric motor 20b, both contained in a cylindrical housing 20a. The sub-compressor unit 200 is installed on the vehicle so that the sub-compressor 20c is positioned at a upper side and the electric motor 20b at a lower side. The sub-compressor 20c is driven by the electric motor 20b, and the refrigerant flowing into the sub-circuit is compressed in the sub-compressor 20c and supplied to the refrigeration circuit A.

The electric motor 20b is composed of a stator 20e having a magnet fixed to the housing 20a and a rotor 20f having an armature winding. A driving shaft 20d connected to the rotor 20f and supported by bearings 20n drives the sub-compressor 20c. The rotor 20f includes a commutator 20g to which electrical power is supplied from brushes 20h which slidably contact the commutator 20g. The sub-compressor 20c is a known one, e.g., a compressor having a swash-plate, a scroll rotor, vanes or rolling pistons. An inlet port 20j of the sub-compressor 20c is connected to the first junction X through the inlet pipe 21, and an outlet port 20k is connected to the second junction Y through the outlet pipe 22. The driving shaft 20d is hermetically sealed by a sealing member 20m so that the refrigerant in the sub-compressor 20c does not enter into the motor 20b.

Figure 4:
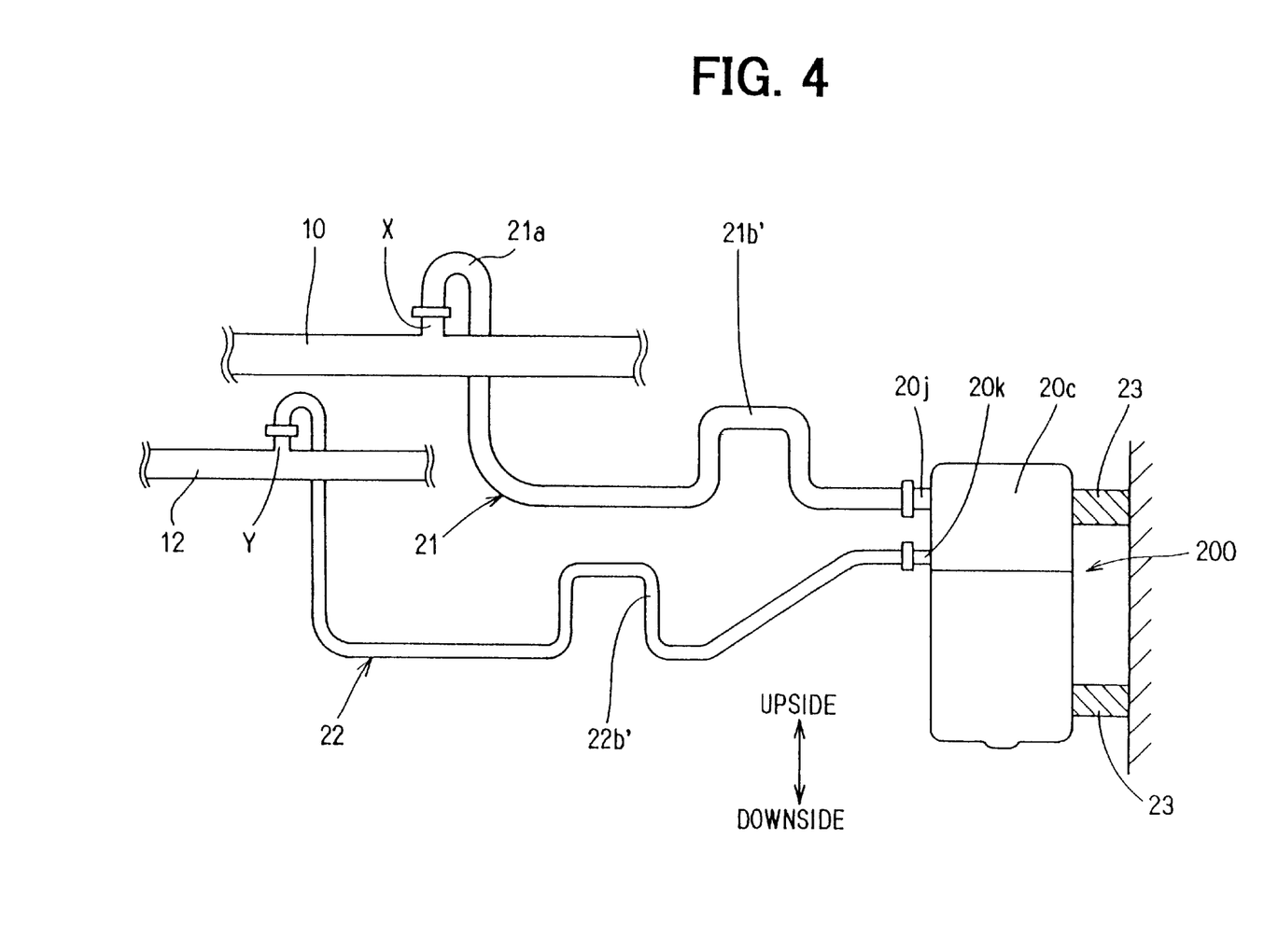
FIG. 4 is a schematic view showing a modified form of inlet and outlet pipes of the sub-circuit.

Now, referring to FIG. 3, how the sub-circuit having the sub-compressor 20c is connected to the main refrigerant circuit A will be described. The sub-compressor unit 200 is installed in the engine compartment 1 (refer to FIG. 1) via a shock-absorber 23 to suppress vibration transferred to the sub-compressor unit 200 from the vehicle body. In this particular embodiment shown in FIG. 3, the sub-compressor 20c is positioned below both the first junction X and the second junction Y. The inlet pipe 21 is connected to the first junction X via an uprising portion 21a formed in an inverse-U-shape, one side of which rises upward from the first junction X. Similarly, the outlet pipe 22 is connected to the second junction Y via an uprising portion 22a formed in an inverse-U-shape, one side of which rises upward from the second junction Y. The inlet pipe 21 includes a looped portion 21b for absorbing vibration, and similarly the outlet pipe 22 includes a looped portion 22b. The looped portions 21b, 22b may be changed to cranked portions 21b', 22b' as shown in FIG. 4.

Since the inlet pipe 21 and the outlet pipe 22 are connected to the main refrigeration circuit via the uprising portions 21a, 22a, respectively, the refrigerant is prevented from entering into the sub-circuit when the main compressor 3 is operated and the sub-compressor 20c is not operated. Thus, an amount of refrigerant retained in the sub-circuit (the sleeping refrigerant) is reduced. The height of the uprising portions 21a, 22a is determined according to the amount of refrigerant delivered from the main compressor 3.

The inner diameter of the inlet pipe 21 is made approximately one-third of the inner diameter of the low pressure tube 10. Similarly, the inner diameter of the outlet pipe 22 is made approximately one-third of an inner diameter of the high pressure tube 12. To reduce the amount of refrigerant entering into the sub-circuit, it is necessary to make the size of the inlet pipe 21 and the outlet pipe 22 at least smaller than the size of the low pressure tube 10 and the high pressure tube 12, respectively. On the other hand, if the size of the inlet pipe 21 and the outlet pipe 22 is smaller than one-third of the size of the low pressure tube 10 and the high pressure tube 12, respectively, the flow resistance in the sub-circuit excessively increases. Accordingly, it is not adequate to make the size of tubes in the sub-circuit smaller than one-third of the size of the pipes in the main refrigerant circuit.

Figure 5:
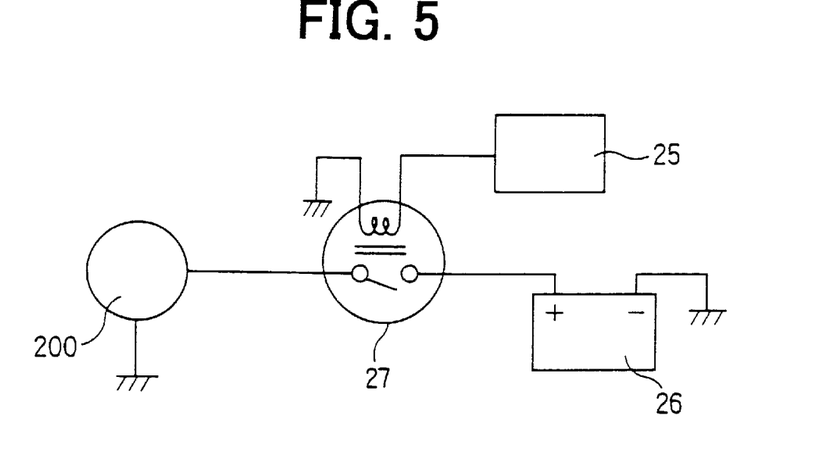
FIG. 5 is a block diagram showing a relay circuit for operating the sub-compressor in an ON-and-OFF fashion.

Referring to FIG. 5, ON-and-OFF control of the sub-compressor 20c will be described. Electric power is supplied from a battery 26 to the electric motor 20b through a relay 27. The sub-compressor 20c is driven by the electric motor 20b. The rely 27 which is made separately from other components is disposed in the engine compartment 1 at a position close to the sub-compressor unit 200. The relay 27 is opened or closed according to a signal fed from a controller 25 positioned in the air-conditioner compartment unit 7 (refer to FIG. 1). When the automotive vehicle temporarily stops at an intersection or the like, its engine 2 is also temporarily stopped by means of the idle-stop device. At that time, a signal to close the relay 27 is given to the relay 27. Upon closing the relay 27, the motor 20b in the sub-compressor unit 200 is rotated thereby to drive the sub-compressor 20c.

The air-conditioner 100 structured as described above operates in the following manner. The main compressor 3 is driven by the engine 2 during a period in which the engine 2 is in operation, and the refrigerant circuit "A" performs its function to cool the air in the passenger's compartment. During a period in which the engine 2 is in operation, the sub-compressor 20c in the sub-circuit is not driven. Since the sub-circuit is connected to the main refrigeration circuit "A" via the rising portions 21a, 22a, the refrigerant circulating in the main refrigeration circuit is prevented from entering into the sub-circuit. During a period in which the automotive engine 2 is not operated, the sub-compressor 20c is driven by the motor 20b powered by the battery 26 to maintain air-conditioning ability in the air-conditioner 100. The capacity of the sub-compressor 20c is made lower than the capacity of the main compressor 3 because the sub-compressor 20c operates only for a relatively short period in which the engine 2 is in a temporary halt.

Advantages of the air-conditioner 100 described above are summarized as follows. Since the sub-circuit having the sub-compressor 20c is connected to the main refrigeration circuit via the rising portions 21a, 22a, the amount of the refrigerant entering the sub-circuit when the sub-compressor 20c is not operated is reduced, and therefore the amount of "sleeping refrigerant" in the sub-circuit is reduced. In a conventional air-conditioner, as explained above, it has been necessary to use check valves for preventing the refrigerant from entering the sub-circuit.

Since the inner diameter of the inlet pipe 21 and the outlet pipe 22 in the sub-circuit is made smaller than the inner diameter of the lower pressure tube 10 and the high pressure tube 12 in the main refrigerant circuit, respectively, the amount of refrigerant entering into the sub-circuit is further reduced, and the amount of refrigerant remaining in the sub-circuit is also reduced. Since the sub-circuit composed of the sub-compressor 20c, the inlet pipe 21 and the outlet pipe 22 is simply connected to the main refrigeration circuit at junctions X, Y, and the relay 27 is a component separate from the controller 25, the sub-circuit can be easily added to an existing main refrigeration circuit.

Since the sub-compressor 20c is mounted in the engine compartment via a shock-absorber 23, and the inlet pipe 21 and the outlet pipe 22 include the looped or cranked vibration absorbing portions 21b, 22b, respectively, vibration generated by the sub-compressor 20c is effectively absorbed. Because the sub-compressor 20c operates when the engine 2 is not operating, it is important to quietly operates the sub-compressor 20c. Since the inlet pipe 21 and the outlet pipe 22 are made of a metallic material, they are manufactured at a low cost compared with pipes made of a resilient material such as rubber. Since the sub-compressor 20c is packaged integrally with the electric motor 20b in a single sub-compressor unit 200, it can be easily mounted on the vehicle. Further, since the electric motor 20b is hermetically sealed from the sub-compressor 20c by the sealing member 20m, it is not necessary to use a specially designed electric motor, but a motor common to other applications can be used.

Figure 6:
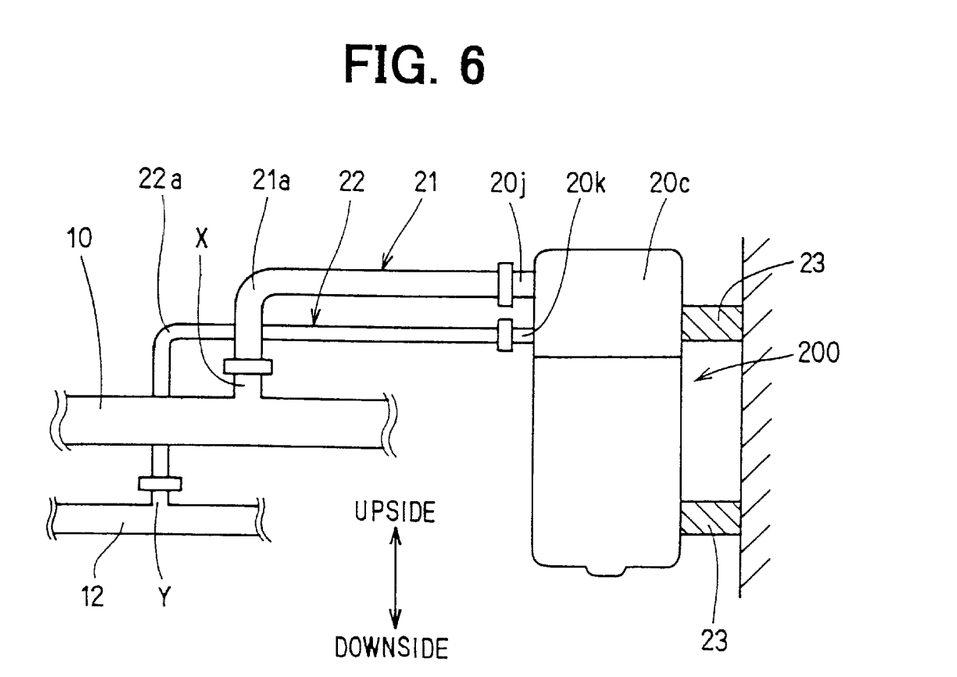
FIG. 6 is a schematic view showing a structure of junctions at which the sub-circuit is connected to the main refrigeration circuit, as a second embodiment of the present invention.

A second embodiment of the present invention will be described with reference to FIG. 6. In this embodiment, the sub-compressor 20c is positioned above the first junction X and the second junction Y. Other structures are the same as those in the first embodiment. Though the looped or cranked vibration-absorbing portions are not shown in FIG. 6, they may be formed in the similar manner as in the first embodiment. An uprising portion 21a of the inlet pipe 21 is connected to the first junction X, and similarly, an uprising portion 22a of the outlet pipe 22 is connected to the second junction Y. The refrigerant circulating in the main refrigeration circuit when the sub-compressor 20c is not operating is prevented from entering into the sub-circuit by the uprising portions 21a, 22a. Accordingly, an amount of refrigerant remaining in the sub-circuit is reduced, and shortage of the refrigerant in the main refrigeration circuit is avoided.

Figure 7:
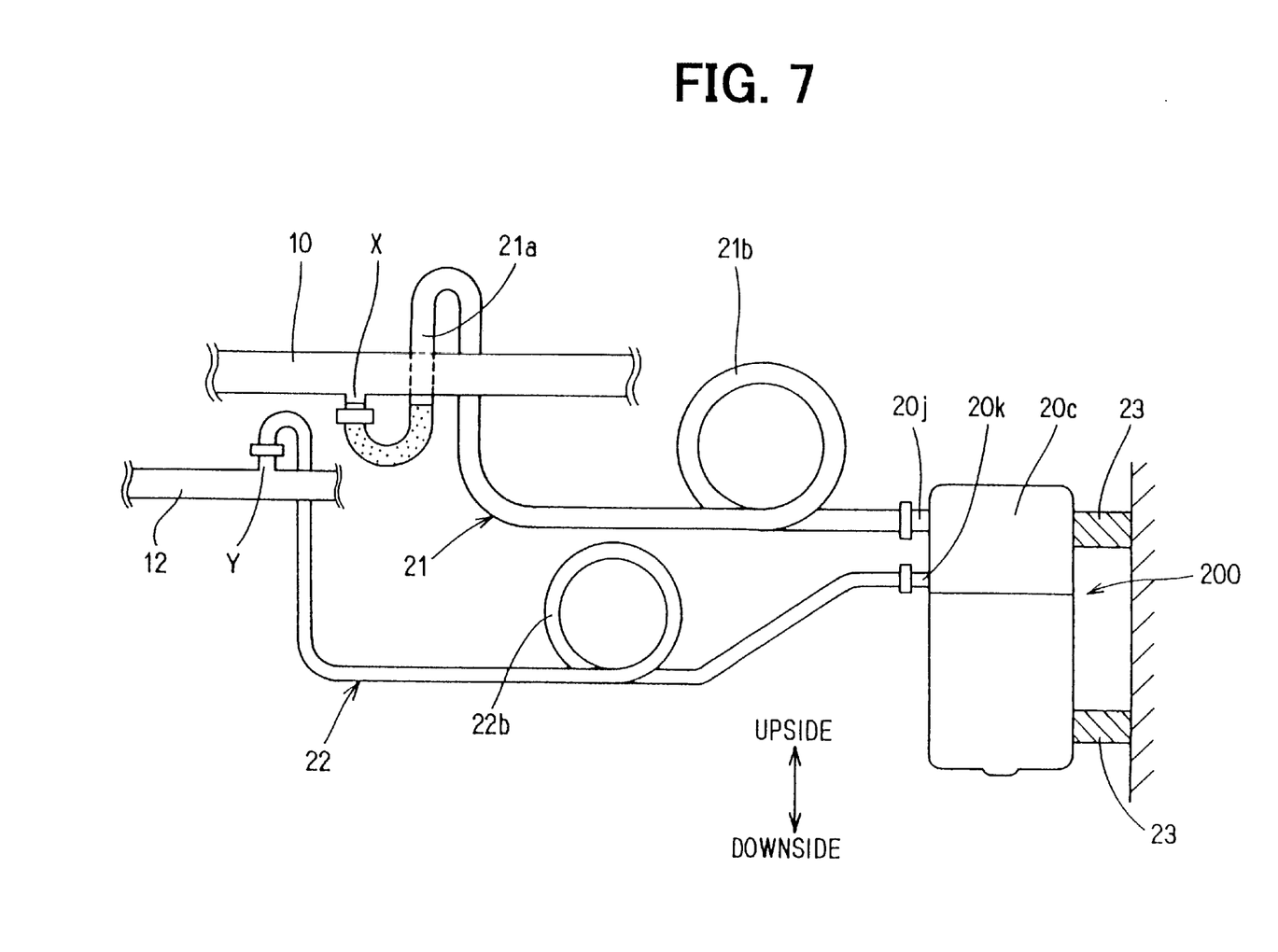
FIG. 7 is a schematic view showing a structure of junctions at which the sub-circuit is connected to the main refrigeration circuit, as a third embodiment of the present invention.

A third embodiment of the present invention will be described with reference to FIG. 7. In this embodiment, the uprising portion 21a connected to the first junction X (shown in FIG. 3) is modified to an uprising portion 21a' as shown in FIG. 7. That is, the uprising portion 21a' is once bent downwardly from the first junction X, forming a U-shaped portion, and the U-shaped portion is connected to an inverse U-shaped portion. The refrigerant retained in the downwardly bent U-shaped portion is sucked into the sub-compressor 20c through the inlet tube 21 when the sub-compressor 20c resumes its operation, and thereby the sub-compressor 20c is properly lubricated.

Figure 8:
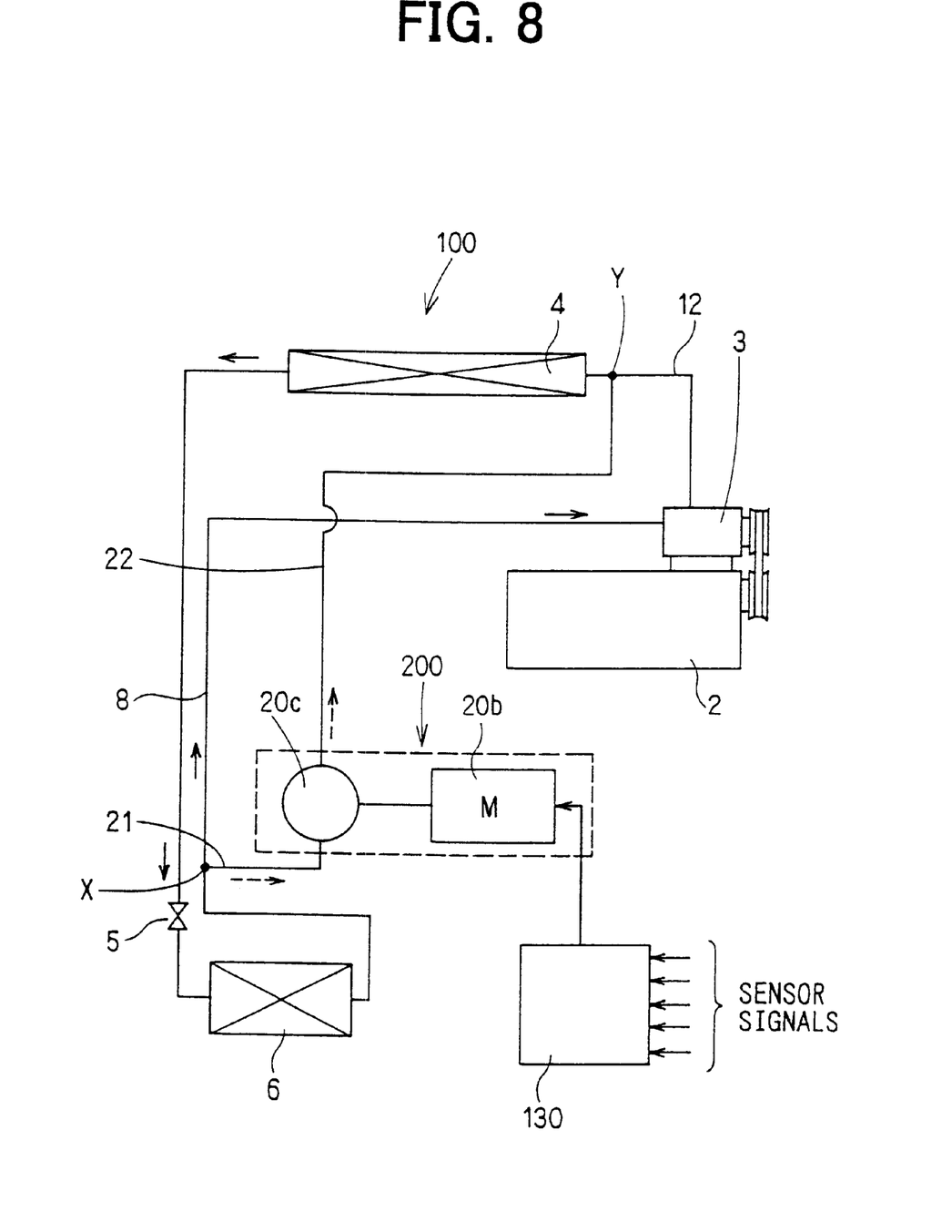
FIG. 8 is a block diagram showing an entire structure of an air-conditioner as a fourth embodiment of the present invention.

A fourth embodiment of the present invention will be described with reference to FIGS. 8–10. An entire structure of an air conditioner 100 is shown in FIG. 8. The sub-circuit composed of the sub-compressor 20c, the inlet pipe 21 and the outlet pipe 22 is connected between the first junction X and the second junction Y in the same manner as shown in FIG. 1. The sub-compressor 20c is driven by an electric motor 20b. In this embodiment, the electric motor 20b is controlled by an electronic controller 130 to which various sensor signals are fed. The sensor signals include a signal indicating whether air-conditioning is required, vehicle speed, engine speed, temperature in the passenger's compartment, and temperature measured immediately after the evaporator 6. Control programs explained below are also stored in the electronic controller 130.

Operation of the sub-compressor 20c is controlled by controlling the electric motor 20b in an ON-and-OFF fashion. A process of controlling the sub-compressor 20c will be described with reference to FIG. 9. At step S10, the sub-compressor 20c is stopped. At step S20, whether cooling is required or not is checked. If it is not required, the process returns to step S10, and the sub-compressor 20c is kept at a non-operating state. If cooling is required, the process proceeds to step S30 where whether the main compressor 3 is under operation is determined. If the main compressor 3 is operating, the process proceeds to step S70, where the sub-compressor 20c is intermittently operated, details of which will be explained later.

If it is determined that the main compressor is not under operation at step S30, the process proceeds to step S40, where whether the vehicle is at a halt (not moving) is determined based on the vehicle speed. If the vehicle is at a halt, the process proceeds to step S50, where whether the engine 2 is at a non-operating state is determined based on the engine speed. If the engine is not operating, the process proceeds to step S60, where the sub-compressor 20c is driven by turning on the motor 20b. Thereafter, the sub-compressor 20c is kept operated until the engine 2 resumes its operation. That is, the cooling ability of the air-conditioner 100 is maintained by operating the sub-compressor 20c during a period in which the main compressor 3 is not driven by the engine 2.

If it is determined that the vehicle is not at a halt at step S40, the process returns to step S10, and the sub-compressor 20c is stopped. Similarly, if it is determined that the engine 2 is not at a halt at step S50, the process returns to step S10, and the sub-compressor 20c is stopped.

Figure 9:
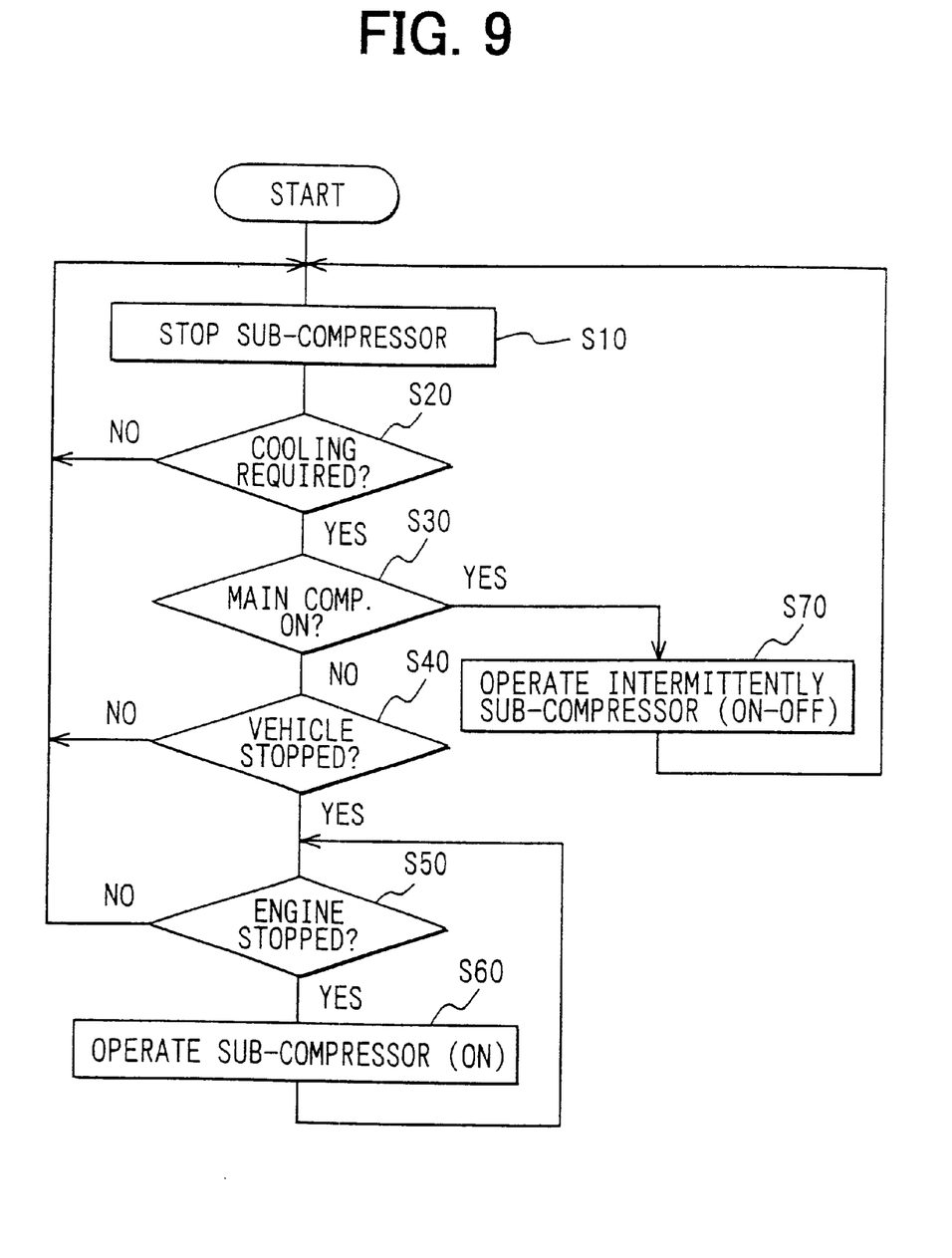
FIG. 9 is a flowchart showing a process of controlling a sub-compressor used in the air-conditioner shown in FIG. 8.
Figure 10:
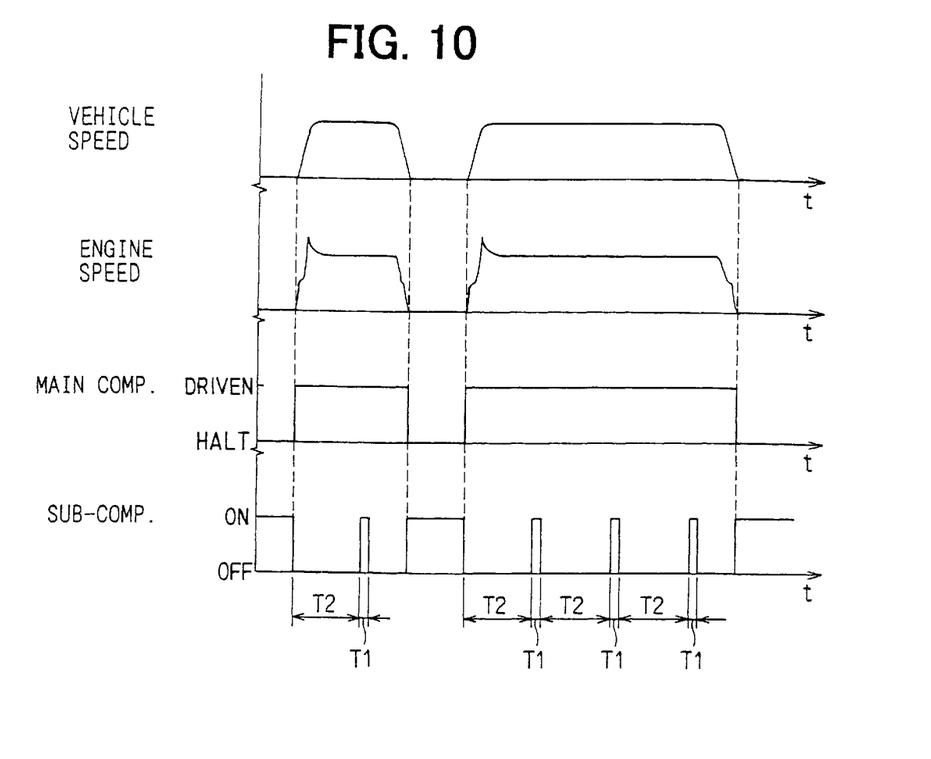
FIG. 10 is a timing chart showing operation of a sub-compressor in relation to operation of a main compressor.

FIG. 10 shows a timing chart of the sub-compressor control explained above. The vehicle speed is shown in (a), the engine speed in (b), operation of the main compressor 3 in (c), and the ON-and-OFF control of the sub-compressor 20c in (d). As shown in (c) and (d), the main compressor 3 and the sub-compressor 20c are alternately operated. In other words, the sub-compressor 20c is driven by the motor 20b during a period in which the main compressor 3 is not driven by the engine 2. However, as shown in (d), the sub-compressor 20c is intermittently driven in the period in which the main compressor 3 is being driven. This intermittent operation is performed at step S70 shown in FIG. 9. As shown in (d), the sub-compressor 20c is driven for a predetermined short period T1 in order to return the refrigerant entered into the sub-circuit to the main refrigeration circuit. The intermittent operation is periodically repeated with a predetermined interval T2.

Since the refrigerant (mixed with lubricant) entered into the sub-circuit composed of the sub-compressor 20c, the inlet pipe 21 and the outlet pipe 22 when the sub-compressor 20c is not operating is returned to the main refrigeration circuit including the main compressor 3, a shortage of lubricant in the main refrigeration circuit is avoided. Accordingly, not only is the cooling ability of the refrigeration circuit kept stable, but the main compressor 3 is properly lubricated and its durability is improved. Further, since the refrigerant is periodically returned to the main refrigeration circuit, an amount of the refrigerant remaining in the sub-circuit is effectively reduced. The periods of time T1 and T2 are predetermined according to conditions of the remaining refrigerant in respective air-conditioners.

The timing for returning the refrigerant in the sub-circuit to the main refrigeration circuit may be modified according to individual needs. It is necessary, however, that the refrigerant be returned to the main refrigerant circuit at least every time when the main compressor 3 resumes it operation.

Figure 11:
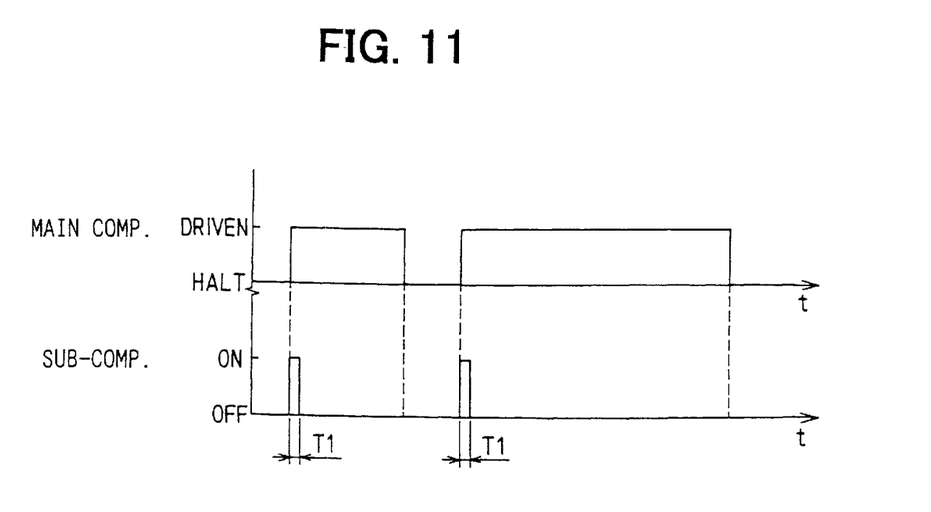
FIG. 11 is a timing chart showing operation of a sub-compressor as a fifth embodiment of the present invention.

A fifth embodiment of the present invention will be described with reference to FIG. 11. In this embodiment, the sub-compressor 20c is operated only as much as necessary to maintain the cooling ability of the air-conditioner 100 during a period in which the main compressor 3 is not in operation. For example, if the cooling ability of the main refrigeration circuit is higher than necessary, the sub-compressor 20c may not be operated even in a period in which the main compressor 3 is not operating. In this case, there is a possibility that the sub-compressor 20c remains at a non-operating state for a long time, and a large amount of the refrigerant may remain in the sub-circuit. If this occurs, the refrigerant becomes short in the main refrigeration circuit, causing insufficient lubrication of the main compressor 3.

Therefore, in this embodiment, the sub-compressor 20c is operated every time when the main compressor 3 resumes its operation, while keeping operation of the sub-compressor at a low level which only satisfies the necessary cooling ability. FIG. 11 shows the operation of the sub-compressor 20c during the period in which the main compressor 3 is in operation. As shown in FIG. 11, the sub-compressor 20c is driven every time after the main compressor 3 resumes its operation. The sub-compressor 20c is driven only for a predetermined short period of time T1. Since the refrigerant is returned to the main refrigeration circuit every time the main compressor 3 resumes its operation, the main compressor 3 can be properly lubricated. Further, since the sub-compressor 20c is periodically operated, components of the sub-compressor 20c are protected from sticking to one another.

Figure 12:
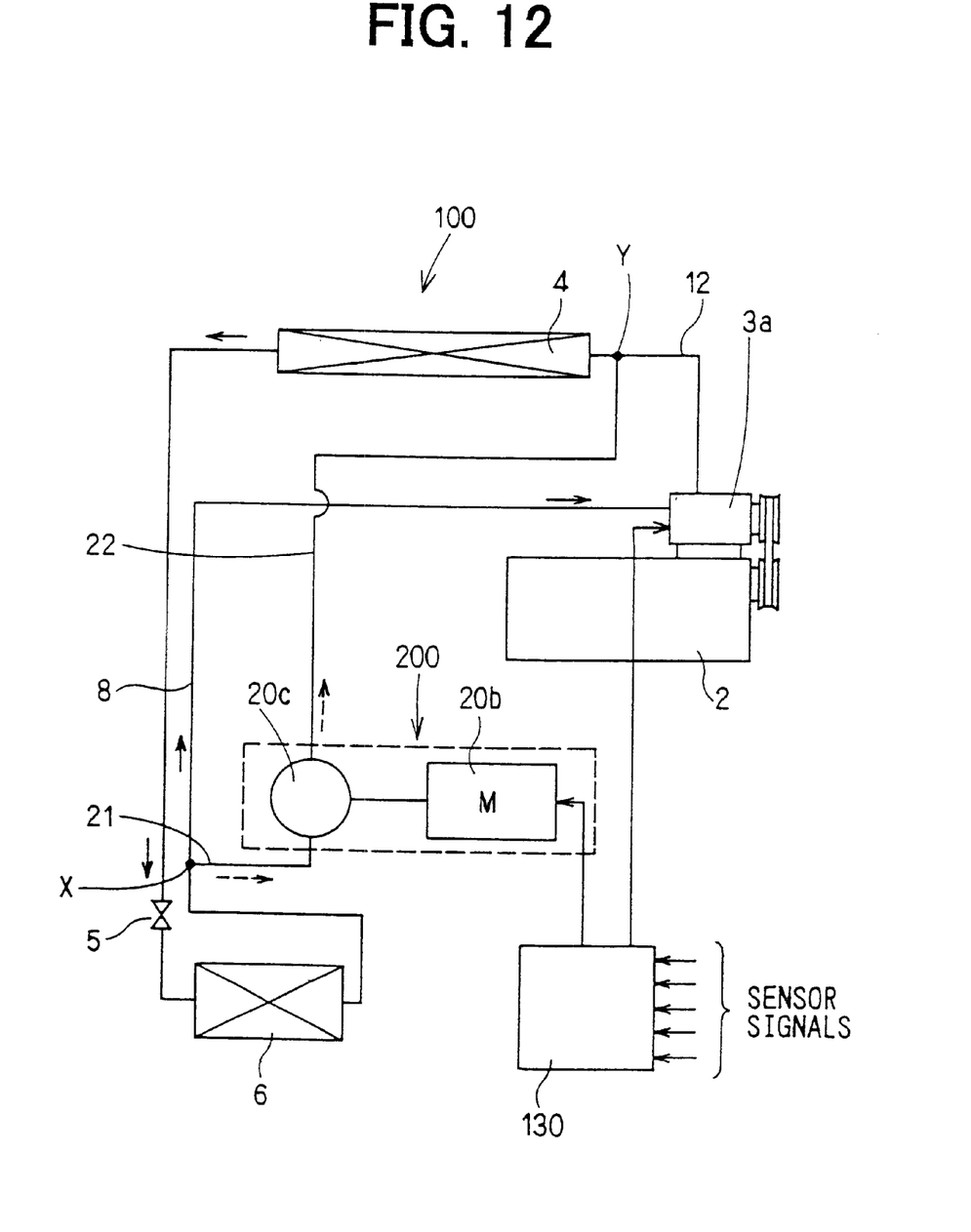
FIG. 12 is a block diagram showing an entire structure of an air-conditioner as a sixth embodiment of the present invention.

A sixth embodiment of the present invention will be described with reference to FIGS. 12–14. In this embodiment, the main compressor 3 which is operated in an ON-and-OFF fashion is replaced with a compressor 3a having a variably controllable capacity (referred to as a variable-capacity compressor). As shown in FIG. 12, the variable-capacity compressor 3a is also controlled by the electronic controller 130. Other structures of the air-conditioner 100 are the same as those of the foregoing embodiments. The variable-capacity compressor 3a used as the main compressor and the sub-compressor 20c are alternately operated in this embodiment, too. However, the capacity of the variable-capacity compressor 3a is changed during a period in which it is in operation.

Figure 13:
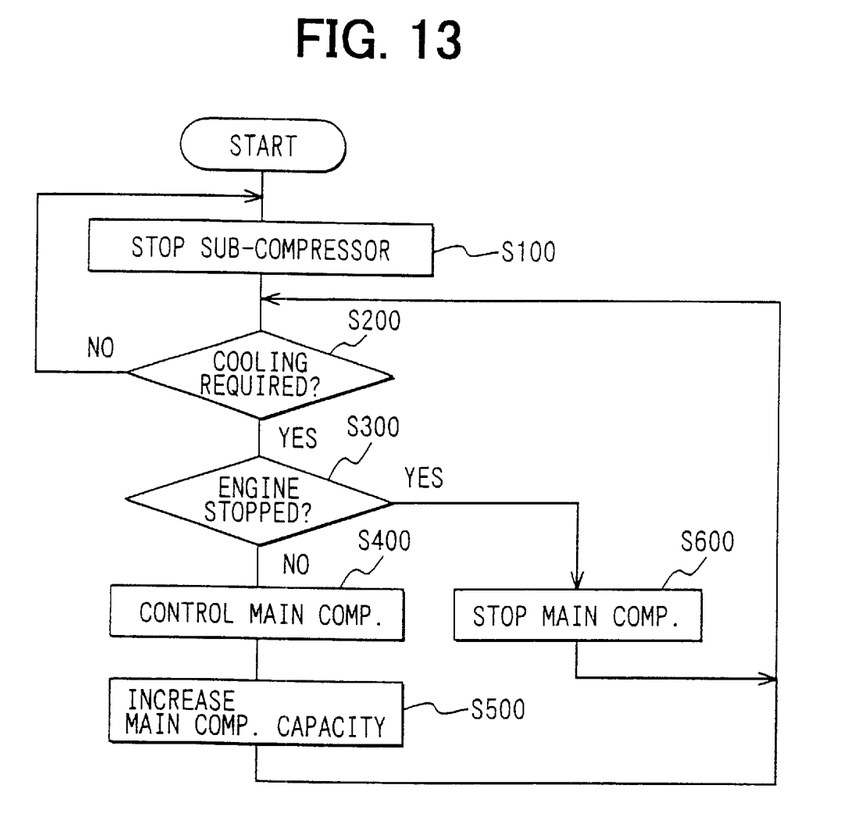
FIG. 13 is a flowchart showing a process of controlling a main compressor used in the air-conditioner shown in FIG. 12.
Figure 14:
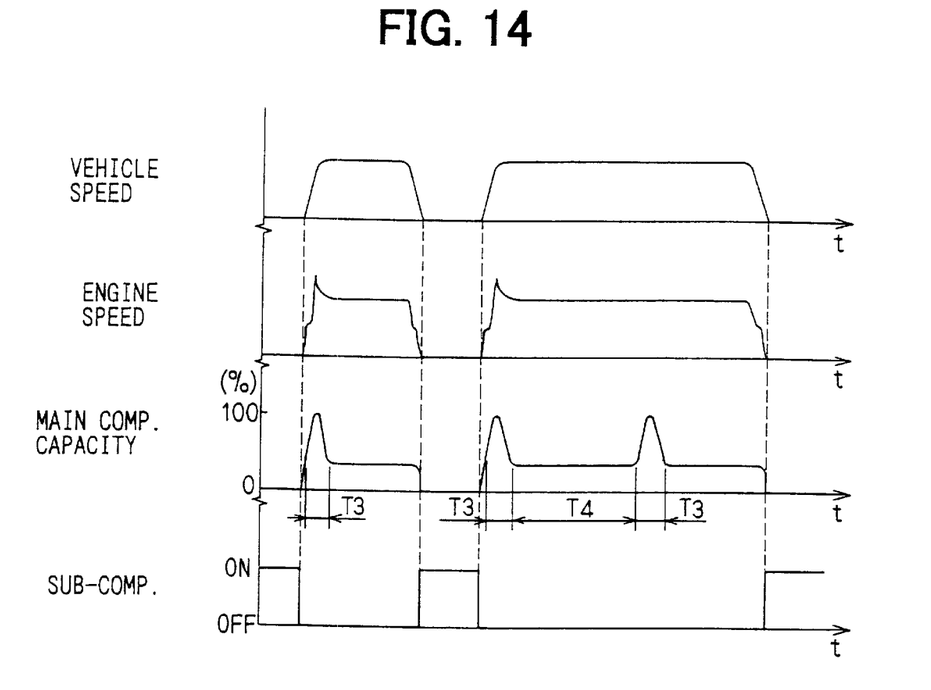
FIG. 14 is a timing chart showing controlled operation of the main compressor used in the sixth embodiment.

Referring to FIG. 13, a process of controlling the variable-capacity compressor 3a and the sub-compressor 20c will be explained. At step S100, the sub-compressor 20c is stopped. Then, at step S200, whether there is a request for cooling is determined. If not, the process returns to step S100, where the sub-compressor 20c is kept at a non-operating state. If there is a request for cooling, the process proceeds to step S300, where whether the engine 2 is at a non-operating state is determined. If the engine 2 is in operation, the process proceeds to step S400 and then to step S500, where the variable-capacity compressor 3a is controlled to change its capacity according to the temperature in the passenger's compartment and the temperature measured downstream of the evaporator 6. Details of the capacity control will be explained later, referring to a timing chart shown in FIG. 14. Then, the process returns to step S200 to repeat the above-described process. On the other hand, if it is determined that the engine 2 is at a non-operating state at step S300, the process proceeds to step S600, where the variable-capacity compressor 3a is stopped. Then, the process returns to step S200.

The controls of the variable-capacity compressor 3a and the sub-compressor 20c explained above are shown in a timing chart in FIG. 14. The vehicle speed is shown in (a), the engine speed in (b), the controlled capacity of the variable-capacity compressor 3a in (c), and the ON-and-OFF control of the sub-compressor 20c in (d). The variable-capacity compressor 3a and the sub-compressor 20c are alternately operated as shown in (c) and (d). The capacity of the variable-capacity compressor 3a is changed during a period in which it is in operation as shown in (c). That is, every time when its operation starts, the capacity is increased to a level higher than a level that attains a required cooling ability for a predetermined period of time T3. In this particular embodiment, the capacity is increased to a maximum level of the variable-capacity compressor 3a. The capacity increase for the period of time T3 is repeated thereafter with a predetermined interval T4.

Since, in this embodiment, the capacity of the variable-capacity compressor 3a is increased to a high level every time when its operation resumes for a predetermined period T3, the refrigerant retained in the sub-circuit including the sub-compressor 20c is sucked into the main refrigeration circuit by the increased sucking ability of the variable-capacity compressor 3a. Accordingly, shortage of the refrigerant in the main refrigeration circuit is avoided, and the cooling ability is properly maintained, and the variable-capacity compressor 3a is properly lubricated. In other words, the refrigerant remaining in the sub-circuit is quickly returned to the main refrigeration circuit by the increased sucking ability of the variable-capacity compressor 3a every time when its operation resumes. Thereafter, the capacity increase is repeated with a predetermined interval T4 as shown in FIG. 14. In this manner, the variable-capacity compressor 3a used as the main compressor is sufficiently lubricated without fail. The sixth embodiment may be combined with the fourth embodiment. That is, the intermittent operation of the sub-compressor 20c may be performed also in the sixth embodiment.

Figure 15:
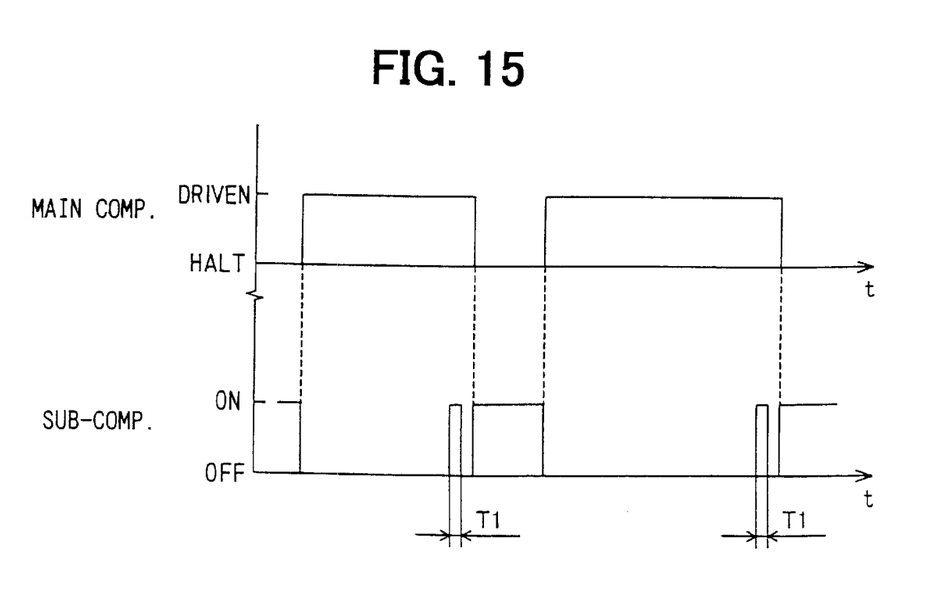
FIG. 15 is a timing chart showing a process of controlling a sub-compressor as a seventh embodiment.

A seventh embodiment of the present invention will be described with reference to FIG. 15. In this embodiment, the structures of the air-conditioner 100 are the same as those in the fourth embodiment. However, intermittent operation of the sub-compressor 20c is performed at a different timing from that of the fourth embodiment to cope with a situation where the refrigerant is retained in the main refrigeration circuit and becomes short in the sub-circuit including the sub-compressor 20c. As shown in FIG. 15, the sub-compressor 20c is operated for the period of time T1 immediately before the sub-compressor 20c resumes its operation. In this manner, the lubricant retained in the main refrigeration circuit during a period in which the sub-compressor 20c is not in operation is returned to the sub-circuit, and thereby the sub-compressor 20c can be operated under sufficient lubrication when it resumes operation.

An eighth embodiment will be described with reference to FIG. 16. In this embodiment, the period of time T1 for returning the lubricant remaining in the sub-circuit by the intermittent operation of the sub-compressor 20c is changed according to engine operating conditions. Though the period of time T1 is fixed to a predetermined value in the fourth and fifth embodiments described above, it is changed, in this embodiment, in the process of controlling operation of the sub-compressor 20c.

Figure 16:
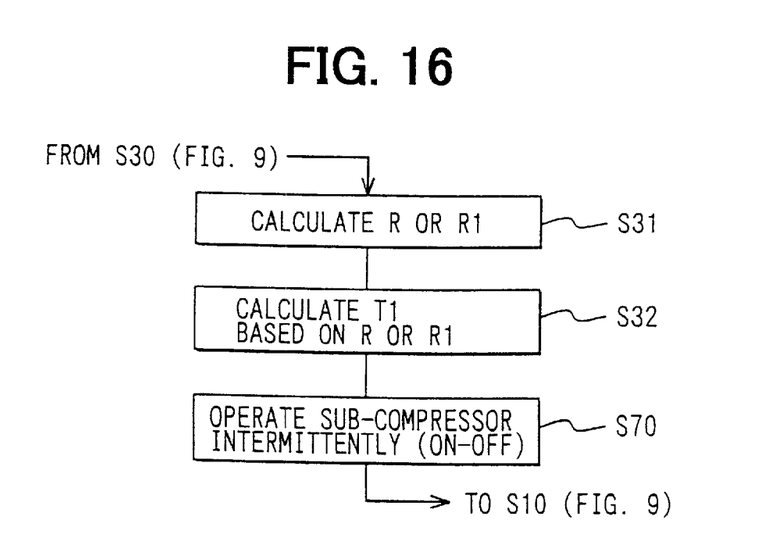
FIG. 16 is a flowchart showing a process of controlling a sub-compressor as a eighth embodiment.

Steps S31 and S32 shown in FIG. 16 are added between steps S30 and S70 shown in FIG. 9. At step S31, a ratio R indicating an operating condition of the engine 2 is calculated according to the following formula: $R=\Sigma Ti/\Sigma Tr$, where Ti is a period of time in which the engine 2 is not operated in each ON-and-OFF control of the engine, and Tr is a period of time in which the engine 2 is operated. Ti and Tr are summed up for a predetermined period counting from a present time to obtain $\Sigma Ti$ and $\Sigma Tr$, respectively. Data necessary for the above calculation are obtained from the engine speed and the vehicle speed fed to the electronic controller 130 and from a timer contained in the electronic controller 130.

The period of time T1 is set to a longer period as the ratio R becomes smaller, and vice versa. The fact that R is small means that the engine 2 is in operation for a longer period of time compared with a period of time in which the engine is not in operation. In other words, the main compressor 3 is in operation for a longer period of time while the sub-compressor 20c is in operation for a shorter period of time. In this situation, a larger amount of the lubricant accumulates in the sub-circuit including the sub-compressor 20c. Therefore, the period of time T1 for returning the lubricant retained in the sub-circuit to the main refrigeration circuit is made longer. On the contrary, the fact that the ratio R is large means that the sub-compressor 20c runs for a longer period of time. In this situation, an amount of lubricant retained in the sub-circuit is small. Therefore, the period of time T1 for returning the lubricant to the main refrigeration circuit is set to a shorter period. By. controlling the period of time T1 in this manner, the main compressor 3 is sufficiently lubricated, and electric power required for intermittently driving the sub-compressor 20c is saved.

The period of time T1 may be changed based on a required heat load, i.e., on an actual operation ratio R1 of the sub-compressor 20c, which is calculated according to the following formula: $R1=Td/Ti$, where Td is a period of time in which the sub-compressor 20c is actually operated in a given period of time Ti in which the engine 2 is not in operation. The ratio R1 is averaged for a certain period of time counting from a present time, and the averaged R1 is used to determine the period of time T1. The period of time T1 is set to a longer period as R1 becomes smaller, and vice versa. In a situation where R1 is small, the sub-compressor 20c is kept in a non-operating state for a long time, and a large amount of lubricant accumulates in the sub-circuit. Therefore, the period of time T1 for returning the refrigerant to the main refrigerant circuit is made longer. On the contrary, in the situation where R1 is large, the sub-compressor 20c is in a non-operating state for a short time, and only a small amount of refrigerant remains in the sub-circuit. Accordingly, the period of time T1 for returning the refrigerant to the main refrigerant circuit is made shorter. By changing the period of time T1 according to R1, the same advantages as those obtained by changing T1 according to R are obtained.

In the situation where the refrigerant remaining in the main refrigeration circuit is returned to the sub-circuit as done in the seventh embodiment, the period of time T1 can be changed in a similar manner as in the eighth embodiment described above.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An air-conditioner for use in an automotive vehicle in which its engine is automatically stopped when the vehicle temporarily stops, the air-conditioner comprising:

a refrigeration circuit including a main compressor driven by the engine, a condenser, an expansion valve and an evaporator, all being connected in series, the main compressor and the evaporator being connected through a low pressure tube, the main compressor and the condenser being connected through a high pressure tube; and a sub-compressor having an inlet pipe and an outlet pipe, the sub-compressor being connected in parallel to the main compressor and being adapted to be driven by an electric motor when the engine is not in operation, wherein:

the inlet pipe of the sub-compressor is connected to a first junction formed in the low pressure tube, and the outlet pipe of the sub-compressor is connected to a second junction formed in the high pressure tube; and an inner diameter of the inlet pipe is smaller than that of the low pressure tube, and an inner diameter of the outlet pipe is smaller than that of the high pressure tube such that the amount of refrigerant flowing through the sub-compressor is restricted in comparison to that flowing through the main compressor.

2. The air-conditioner as in claim 1, wherein:

the inner diameter of the inlet pipe is larger than one-third of the inner diameter of the low pressure tube, and the inner diameter of the outlet pipe is larger than one-third of the inner diameter of the high pressure tube.

3. The air-conditioner as in claim 1, wherein:

the sub-compressor is positioned at a higher position than the first and the second junctions; and the inlet pipe of the sub-compressor is branched out upwardly from the first junction, and the outlet pipe of the sub-compressor is branched out upwardly from the second junction.

4. The air-conditioner as in claim 1, wherein:

the sub-compressor is positioned at a lower position than either one of the first junction or the second junction; and the inlet pipe of the sub-compressor includes a portion rising upward from the first junction, and the outlet pipe of the sub-compressor includes a portion rising upward from the second junction.

5. The air-conditioner as in claim 4, wherein:

the portion rising upward from the first junction is connected to a U-shaped portion branched out downwardly from the first junction.

6. The air-conditioner as in claim 1, wherein:

a capacity of the sub-compressor is smaller than that of the main compressor.

7. The air-conditioner as in claim 6, wherein:

the sub-compressor and the electric motor for driving the sub-compressor are integrally formed as a unitary body, and the electric motor is a direct current motor having brushes.

8. The air-conditioner as in claim 7, wherein:

the electric motor is hermetically sealed from the sub-compressor by a sealing member disposed around a rotating shaft of the electric motor.

9. The air-conditioner as in claim 1, wherein:
the low pressure tube is composed of a first metallic tube and a first flexible hose, the first flexible hose being connected to the main compressor; and
the high pressure tube is composed of a second metallic tube and a second flexible hose, the second flexible hose being connected to the main compressor.

10. The air-conditioner as in claim 9, wherein:
the first junction is formed in the first metallic tube, and the second junction is formed in the second metallic tube.

11. The air-conditioner as in claim 10, wherein:
the inlet pipe of the sub-compressor includes a first portion for absorbing vibration of the sub-compressor; and
the outlet pipe of the sub-compressor includes a second portion for absorbing vibration of the sub-compressor.

12. An air-conditioner for use in an automotive vehicle in which its engine is automatically stopped every time when the vehicle temporarily stops, the air-conditioner comprising:
a refrigeration circuit including a main compressor driven by the engine, a condenser, an expansion valve and an evaporator, all being connected in series, the main compressor and the evaporator being connected through a low pressure tube, the main compressor and the condenser being connected through a high pressure tube; and
a sub-compressor having an inlet pipe and an outlet pipe, the sub-compressor being connected in parallel to the main compressor and being adapted to be driven by an electric motor when the engine is not in operation, wherein:
the inlet pipe of the sub-compressor is connected to a first junction formed in the low pressure tube, and the outlet pipe of the sub-compressor is connected to a second junction formed in the high pressure tube;
the electric motor for driving the sub-compressor is controlled by an electronic controller; and
the sub-compressor is driven by the electric motor for a predetermined period of time during a period in which the main compressor is in operation.

13. The air-conditioner as in claim 12, wherein:
the sub-compressor is driven by the electric motor for the predetermined period of time every time the engine is brought into operation.

14. The air-conditioner as in claim 12, wherein:
the sub-compressor is intermittently and repeatedly driven by the electric motor for the predetermined period of time with a predetermined interval during a period in which the engine is in operation.

15. The air-conditioner as in claim 12, wherein:
the sub-compressor is driven, during a period in which the main compressor is not in operation, so that a cooling effect attained by operation of the main compressor is maintained; and
the sub-compressor is driven by the electric motor for the predetermined period of time every time the engine is brought into operation.

16. The air-conditioner as in claim 12, wherein:
the sub-compressor is driven by the electric motor for the predetermined period of time immediately before the engine stops its operation.

17. The air-conditioner as in claim 12, wherein:
the electronic controller changes the predetermined period of time based on a ratio of a period of time in which the engine is not in operation relative to a period of time in which the engine is in operation.

18. The air-conditioner as in claim 12, wherein:
the electronic controller changes the predetermined period of time based on a ratio of a period of time in which the sub-compressor is actually driven by the electric motor relative to a period of time in which the engine is not in operation.

19. An air-conditioner for use in an automotive vehicle in which its engine is automatically stopped every time when the vehicle temporarily stops, the air-conditioner comprising:
a refrigeration circuit including a main compressor driven by the engine, a condenser, an expansion valve and an evaporator, all being connected in series, the main compressor and the evaporator being connected through a low pressure tube, the main compressor and the condenser being connected through a high pressure tube; and
a sub-compressor having an inlet pipe and an outlet pipe, the sub-compressor being connected in parallel to the main compressor and being adapted to be driven by an electric motor when the engine is not in operation, wherein:
the inlet pipe of the sub-compressor is connected to a first junction formed in the low pressure tube, and the outlet pipe of the sub-compressor is connected to a second junction formed in the high pressure tube;
the main compressor has a variable capacity which is controlled by an electronic controller; and
the capacity of the main compressor is increased to a capacity which is higher than a capacity necessary to attain a required cooling ability for a predetermined period of time during a period of time in which the main compressor is in operation.

20. The air-conditioner as in claim 19, wherein:
the capacity of the main compressor is increased for the predetermined period of time every time when the main compressor is brought into operation.

21. The air-conditioner as in claim 20, wherein:
the capacity of the main compressor is intermittently and repeatedly increased for the predetermined period of time with a predetermined interval during the period of time in which the main compressor is in operation.

22. An air-conditioner for use in an automotive vehicle in which its engine is automatically stopped every time when the vehicle temporarily stops, the air-conditioner comprising:
a refrigeration circuit including a main compressor driven by the engine, a condenser, an expansion valve and an evaporator, all being connected in series, the main compressor and the evaporator being connected through a low pressure tube, the main compressor and the condenser being connected through a high pressure tube; and
a sub-compressor having an inlet pipe and an outlet pipe, the sub-compressor being connected in parallel to the main compressor and being adapted to be driven by an electric motor when the engine is not in operation, wherein:
the inlet pipe of the sub-compressor is connected to a first junction formed in the low pressure tube, and the outlet pipe of the sub-compressor is connected to a second junction formed in the high pressure tube; and
the inlet pipe of the sub-compressor includes a portion rising upward from the first junction, and the outlet pipe of the sub-compressor includes a portion rising upward from the second junction.

* * * * *